May 17, 1932.  F. R. OWENS  1,859,155
PARACHUTE
Original Filed Nov. 23, 1928  2 Sheets-Sheet 1
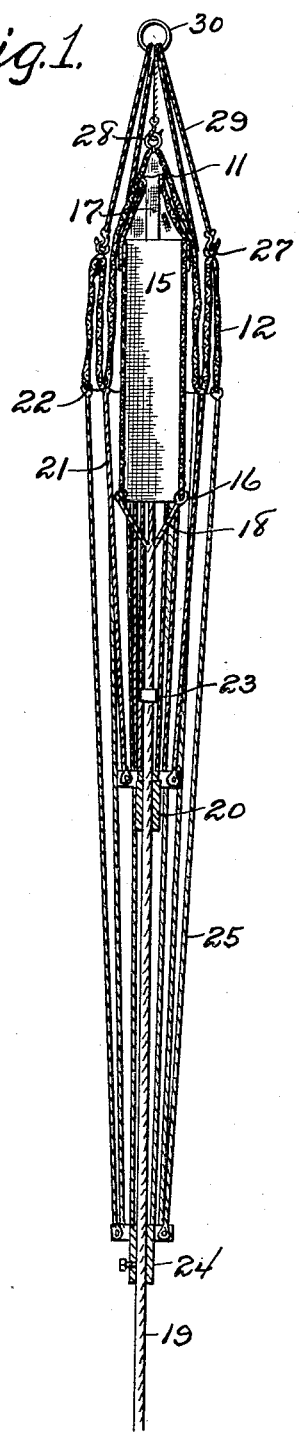
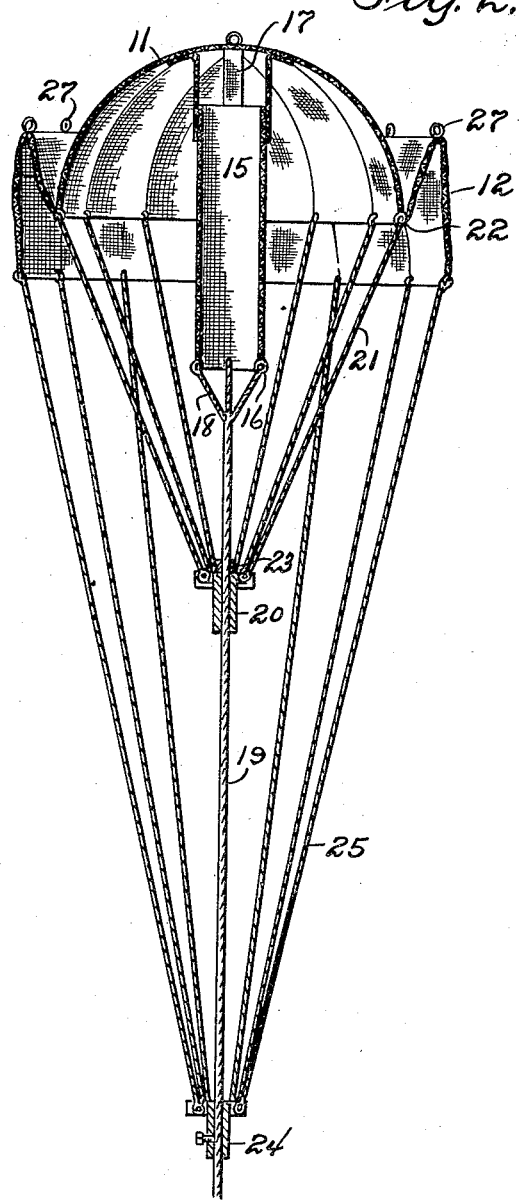
Frank Roderick Owens
INVENTOR
BY Victor J. Evans
ATTORNEY

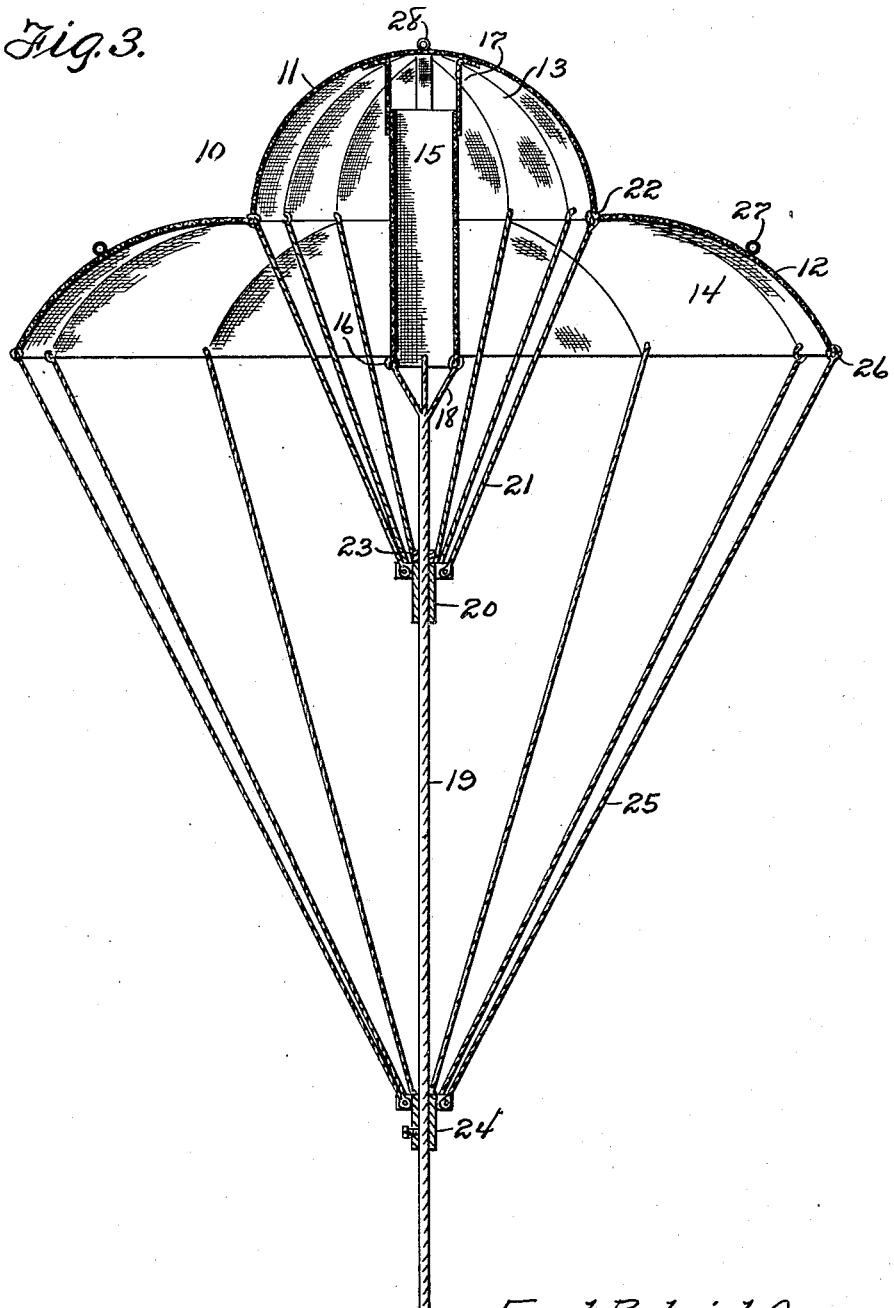

Patented May 17, 1932

1,859,155

UNITED STATES PATENT OFFICE

FRANK R. OWENS, OF BEAVER CROSSING, NEBRASKA

PARACHUTE

Refile of abandoned application Serial No. 321,424, filed November 23, 1928. This application filed October 27, 1930. Serial No. 491,614.

This invention relates to parachutes and has for an object the provision of a parachute in which the opening will be rapid, and positively assured by the provision of means for directing air into the folded parachute body at the beginning of a descent.

Another and important object of the invention is the provision of means whereby the parachute body will be opened in sections, the initially opened section taking up the load prior to the opening of the other section, so as to provide a shock absorber, and thus obviate jar occasioned by the sudden opening of the entire parachute body.

With the above and other objects in view, the inventon further includes the following novel features and details of construction, to be hereinafter more fully described, illustrated in the accompanying drawings and pointed out in the appended claims.

In the drawings:—

Figure 1 is a sectional view of the parachute showing the same in collapsed position.

Figure 2 shows the parachute partly opened.

Figure 3 is a section with the parachute fully opened.

Referring to the drawings in detail wherein like characters of reference denote corresponding parts, the body of the parachute which is indicated at 10 is shaped to provide a central dome-like section 11 whose outer edge is surrounded by a skirt section 12. The dome-like section 11 provide a central air chamber 13 while the skirt 12 provides an air chamber extension 14.

Disposed axially of the air chamber 13 is a tube 15 whose lower end has secured thereto a metallic or other stiff ring 16 so as to maintain this end of the tube open. The inner end of the tube is secured to the dome-like section 11 by means of straps 17.

Secured to the outer end of the tube 15 by means of relatively short ropes 18 is the main supporting rope 19 and mounted for sliding movement upon this rope is a ferrule 20. Inner shroud lines or ropes 21 have one of their ends secured to this ferrule while the other or inner ends of these ropes are secured at the juncture of the dome-like section 11 and the skirt 12 as indicated at 22. A stop 23 secured to the rope 19 limits sliding movement of the ferrule 20 in one direction.

Secured upon the rope 19 is a relatively stationary ferrule 24 which has secured thereto ropes 25 and these ropes are in turn secured to the outer edge of the skirt-like section 12 as shown at 26.

Eyes 27 are spaced around the skirt-like section 12 while an eye 28 is secured to the top of the dome-like section 11.

When the parachute is collapsed as shown in Figure 1 of the drawings, the outer end of the tube 15 will extend below the folds of the body and the parachute may be hung by ropes 29 which engage the eyes 27 and 28 and extend from a ring 30. In use, the ropes 29 will be disengaged from the eyes 27 and 28 and at the beginning of the descent, air will enter the open outer end of the tube 15. This air will be directed into the air chamber 13 so that the dome-like section 11 will be distended. Opening of the section 11 will cause the ferrule 20 to slide upward along the rope 19 and no weight will be transferred to the parachute until the ferrule engages the stop 23.

This will cause an initial retarding movement. The parachute will then be in the position shown in Figure 2, continued downward movement causing the skirt section 12 to open so that the full retarding action of the parachute will become effective.

In addition to the above advantages, the arrangement of the ropes 21 and 25 will more evenly distribute the weight throughout the area of the parachute body.

The invention is susceptible of various changes in its form, proportions and minor details of construction and the right is herein reserved to make such changes as properly fall within the scope of the appended claims.

Having described the invention what is claimed is:—

1. In a parachute, a body portion of flexible material shaped to provide a dome-like formation when in open position, a flexible tubular member having flexible connection with the top of the dome and being of a length to project beyond the lower end of the dome when the latter is collapsed, a ring secured in the lower end of the tube, a rope secured to said tube, ropes connected to the dome of the parachute and having a sliding connection with the rope attached to the tube, and ropes connected to the outer edge of the body and having a positive connection with the tube connected rope.

2. A parachute comprising a body of flexible material shaped to provide a central dome and a skirt surrounding the dome, a tube disposed axially of and secured to the central dome with its inner end spaced therefrom and its outer end extending beyond the body when the latter is collapsed, means to maintain the outer end of the tube in open position, a main supporting rope secured to the outer end of the tube, ropes secured to the juncture of the dome and skirt and having a sliding connection with the supporting rope, means to limit said sliding connection in one direction, and ropes secured to the outer edge of the skirt and having a positive connection with the supporting rope.

3. A parachute having a dome of flexible material, a tube having one end secured thereto and in spaced relation to the dome, a ring secured to the lower end of the tube, a rope secured to said ring, a movable ferrule on said rope, a stationary ferrule mounted on said rope, ropes connected at one end to the dome of the parachute and at their opposite ends with the movable ferrule, and ropes connected at one end to the outer edge of the parachute and at their opposite ends to the stationary ferrule.

In testimony whereof I affix my signature.

FRANK R. OWENS.